(12) United States Patent  (10) Patent No.: US 7,595,788 B2
Son  (45) Date of Patent: Sep. 29, 2009

(54) ELECTRONIC DEVICE HOUSING WITH INTEGRATED USER INPUT CAPABILITY

(75) Inventor: Jae S. Son, Rancho Palos Verdes, CA (US)

(73) Assignee: Pressure Profile Systems, Inc., Los Angeles, CA (US)

( * ) Notice: Subject to any disclaimer, the term of this patent is extended or adjusted under 35 U.S.C. 154(b) by 231 days.

(21) Appl. No.: 11/697,026

(22) Filed: Apr. 5, 2007

(65) Prior Publication Data

US 2007/0242037 A1    Oct. 18, 2007

Related U.S. Application Data

(60) Provisional application No. 60/792,379, filed on Apr. 14, 2006.

(51) Int. Cl.
  *G09G 5/00* (2006.01)
(52) U.S. Cl. .......................... 345/168; 345/169; 341/22
(58) Field of Classification Search ......... 345/156–179; 341/22, 23, 33, 34; 400/472, 479, 479.1, 400/490
  See application file for complete search history.

(56) References Cited

U.S. PATENT DOCUMENTS

| | | | | |
|---|---|---|---|---|
| 4,224,615 A | * | 9/1980 | Penz | 345/174 |
| 4,431,882 A | * | 2/1984 | Frame | 341/33 |
| 4,439,647 A | * | 3/1984 | Calandrello et al. | 341/33 |
| 5,555,894 A | | 9/1996 | Doyama | |
| 6,040,823 A | | 3/2000 | Seffernick | |
| 6,563,254 B2 | | 5/2003 | Perkins | |
| 6,771,490 B2 | * | 8/2004 | Peker et al. | 361/679 |
| 6,943,705 B1 | * | 9/2005 | Bolender et al. | 341/33 |
| 6,945,981 B2 | | 9/2005 | Donofrio | |
| 2003/0076306 A1 | | 4/2003 | Zadesky | |
| 2003/0234769 A1 | * | 12/2003 | Cross et al. | 345/173 |
| 2004/0074306 A1 | | 4/2004 | Kinoshita | |
| 2006/0197750 A1 | * | 9/2006 | Kerr et al. | 345/173 |
| 2006/0197753 A1 | | 9/2006 | Hotelling | |
| 2006/0274042 A1 | * | 12/2006 | Krah et al. | 345/163 |

* cited by examiner

*Primary Examiner*—Regina Liang
(74) *Attorney, Agent, or Firm*—Boris Leschinsky

(57) ABSTRACT

An electronic device housing with a seemless user input zone that measures the level of force applied by the user is described. It is particularly advantageous when used with small hand-held consumer electronic devices such as mobile phones, PDAs, game- and media players. A housing for an electronic device includes a seamless user input zone defining a contact force-sensitive deformable area. A capacitance sensor is formed between the conductive inside surface of the housing and the electrode of the rigid base facing that inside surface. Linear support means such as columns support the housing away from the rigid base defining an air gap. Capacitance measurement circuit is deployed to detect the location and force applied by the user onto the housing and send a user input signal to the electronic device.

4 Claims, 3 Drawing Sheets

ELECTRONIC DEVICE HOUSING WITH INTEGRATED USER INPUT CAPABILITY

CROSS-REFERENCE DATA

This application claims the priority of the U.S. Provisional Patent Application No. 60/792,379 filed Apr. 14, 2006 with the same title and incorporated herein in its entirety by reference.

FIELD OF THE INVENTION

The present invention generally relates to electronic devices with housings incorporating user input means based on contact force sensing. More specifically, the invention relates to a hand-held electronic device with a portion of a housing adapted to serve as a contact force-sensitive user input zone. In particular, the user input zone comprises a capacitance touch sensor built using the housing itself thus obviating the need for separate input devices to protrude through the housing.

BACKGROUND

There exist today many types of consumer electronic devices, each of which utilizes some sort of user input and interface. The user interface typically includes an output device in the form of a fixed display such as an LCD and one or more input devices, which can be mechanically actuated as for example, switches, buttons, keys, dials, joysticks, navigation pads, or electrically activated as for example touch pads and touch screens. The display is typically configured to present visual information such as text and graphics, and the input devices are typically configured to perform operations such as issuing commands, making selections or moving a cursor in the consumer electronic device. Each of these well known devices has considerations such as size and shape limitations, costs, functionality, complexity, etc. that must be taken into account when designing the consumer electronic device. In most cases, the user interface is positioned on the front face of the electronic device for easy viewing of the display and easy manipulation of the input devices.

Examples of hand-held electronic devices include mobile phones, PDAs, remote controls, various media and game players, and other navigation and communication devices.

Modern seamless look is one of the desired marketing aspects of present-day electronic devices. Incorporation of user input into the design of such devices without resorting to traditional buttons and switches allows the manufacturers to present their devices to consumers in the most positive light. Touch-sensitive zones on the device housing may serve just such purpose.

Conventional touch-sensitive proximity sensors include a conductive layer covered with a dielectric layer. Touching of the dielectric by a finger causes a change in capacitance because the finger serves as an electrical ground. That change and the location of the touch point are then detected by the control circuitry and used as an input signal for the electronic device.

Traditionally, touch-sensitive zones incorporated in the device housing are made using proximity sensors such as capacitance sensors glued or otherwise firmly attached to the inside surface of the housing. One of the limitations of such proximity sensors is that the user cannot wear gloves when using the device. A glove insulates the finger from the sensor precluding the proper function of the device. The need exists therefore for a touch-sensitive input device capable of working with both conductive and non-conductive user input objects such as a gloved finger or a stylus.

Another known method of sensing the touch of the user through the housing is done by having a thin compressible portion of the housing placed in firm contact with the strain gauge sensor located inside the device. Piezoelectric strip can be used as such a sensor. Pressure from the finger of the user is transmitted as deflection through the deformable housing and sensed as a changed strain through the housing surface by the strain gauge sensor. The signal from the sensor is then used as an input command by the electronic circuitry of the device. This approach requires the device to incorporate several separate components that have to be assembled together to make it work, making manufacturing processes quite complicated and costly.

Examples of devices using this concept are disclosed in the U.S. Pat. Nos. 5,555,894; 6,040,823; 6,945,981; and U.S. Patent Applications Nos. 2003/0076306; 2006/0197750; and 2006/0197753, all incorporated herein by reference in their entirety. The need exists for a simplified touch-sensitive housing that can inherently serve as an input device.

SUMMARY OF THE INVENTION

The present invention addresses the above need by providing a housing for an electronic device with integrated user input capability. More specifically, disclosed herein is a sensing device where the electronic housing itself (which is either a metal or has an inside conductive surface) is used as a deformable structure for a tactile sensor device. A capacitance force sensor is created between the conductive inside surface of the housing serving as a first conductive layer and a rigid non-deformable base having a second conductive layer facing the first conductive layer and spaced apart therefrom at a predetermined gap. This pair of conductive layers separated by a dielectric layer of non-conductive material, such as air, to together make a capacitance sensor. Compression of the housing deforms the first conductive layer and brings it closer to the second conductive layer changing therefore capacitance between them. This in turn allows capacitance-based electrical detection of when a user is applying pressure or force on a selected user input zone of the housing as well as the level of force applied to the housing. Both the fact of compression of the housing in a particular location and the degree of this compression can be used as user input signals for the electronic device.

In comparison with traditional switches, this invention allows the product design to be clean and free of lines and seams associated with conventional buttons. In contrast to recently popular touch switches that detect the presence of a human finger or a conductive object, this approach is also able to work with non-conductive objects such as a person wearing a glove and measure the level of force applied by the user in a proportional sense.

This invention may be used advantageously with reconfigurable or other tactile sensor input devices disclosed elsewhere by the same inventor and also those that are known in the art.

This invention can be used to replace or improve the following technologies and devices:

Descrete button switches that at present require separate components and are only binary;

Mechanical dome switches located under compliant skin or other flexible materials;

Touch pads on laptops that at present only detect contact location and not force; and Ipod scroll wheel that at present does not detect force.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE INVENTION

Product design for electronic devices have become a very important criteria for sales success. Such popular electronic devices as the Ipod are much more simplified and have a clean industrial design. For certain applications where the product designer wants to place a user input fuction on the device housing, but does not want to change or affect the product housing apperance, a capacitance sensing electrode can be used in conjunction with a metalized or metal housing that deflects under applied force. Since the amount of deflection is very small, on the order of about 0.001 to 0.003 of an inch, conventional electronic device housing can be converted to incorporate a user input zone using the fact that many of these types of housings are typically made from a polymer material and are plated with a conductive metal already for electromagnetic emissions and susceptibility requirements. Another more recent trend is to use of metal as the housing structure. When this housing is connected to the ground reference of a circuit that measures capacitance, a deflection of the housing relative to the capacitance electrode can form a basis for a user input device.

Figure 1:
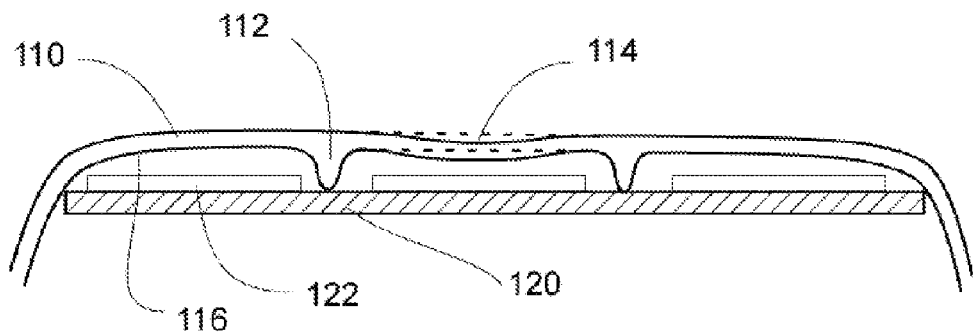
FIG. 1 is a cross-section of the first preferred embodiment of the invention.

FIG. 1 shows a first preferred embodiment of the invention where the deformable contact force-sensitive zone of the electronic housing 110 is shown suspended by a linear support means protruding therefrom such as a ridge 112 at an offset distance from the rigid non-deformable base 120 forming a gap. The design of the linear support means can outline a predetermined selection and size of buttons and switches for each particular application as needed. The first conductive layer 116 is formed on the inside surface of the housing. As an example, the inside surface 116 of the contact force-sensitive user input housing zone 110 can be metalized, printed, vacuum-deposited, sprayed or painted with a conductive material if the housing isn't made entirely from a conductive material such as metal in the first place. It is then connected to the ground reference of a circuit that can measure the capacitance between the inside surface 116 of the first conductive layer and a second conductive layer 122. The electrode of the second conductive layer 122 can be formed by printed circuit board 120 etching method or by printing a conductive paint over a rigid base 120. Since the first conductive layer is separated from the second conductive layer with a predefined gap distance, a capacitance sensor is therefore formed therebetween and incorporated into the housing itself. The user input zone of the housing body contains the housing sections between the linear support means which are all made relatively thin and deformable under pressure. When a user applies force on that section, the housing deflects down as shown from the normal undeflected state indicated by a pair of dashed lines 114. This deflection changes the capacitance between the two conductive layers, which can be measured by the above described circuit and interpreted as an input signal for the electronic device at a particular location on the housing. Moreover, the degree of deflection can also be detected by the same circuit such that the input device can detect the level of force applied to the housing.

Various dielectric compressible structures can be placed optionally between the two conductive layers to fill the air gap and to form a more comprehensive capacitance sensor.

Figure 2:
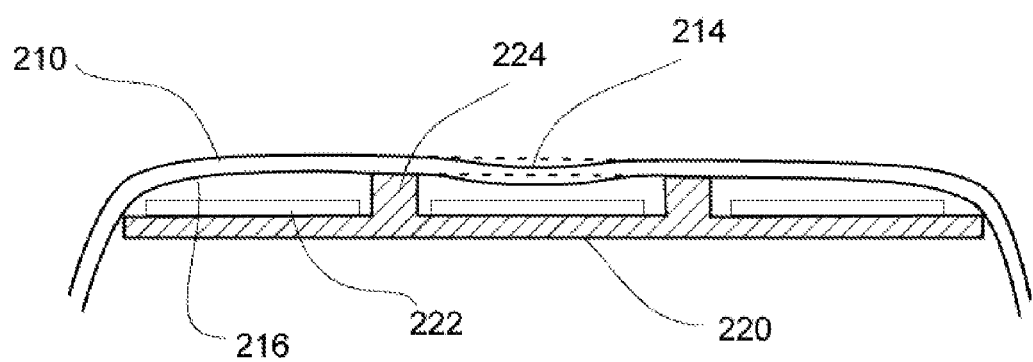
FIG. 2 is a cross-section of the second preferred embodiment of the invention.

FIG. 2 shows a second embodiment of the invention where the electronic housing 210 has a contact force-sensitive deformable zone made sufficiently thin such that when a user applies force over that zone, the housing deflects as shown from the normal undeflected state indicated by a pair of dashed lines 214. The capacitance sensor is formed between the inside conductive surface 216 of the housing 210 (first conductive layer) and the second conductive layer 222 of the rigid base 220. The thin housing could be made from plastic or metal and is supported by a linear support means such as columns 224 with an air gap separating it from the rigid base 220. In this embodiment, linear support means are incorporated into the rigid base 220 as opposed to being a part of the housing 210. The sections between the support means form the buttons of the user input zone.

As with the first embodiment, the inside surface of the housing 210 is metalized or painted with a conductive material if it isn't made entirely from a conductive material already. It is then connected to the ground reference of a circuit that can measure the capacitance between by the first conductive layer 216 and second conductive layer 222. The second conductive layer 222 can be formed by printed circuit board 220 etching method or by printing a conductive paint over the base 220.

In a further development of that concept, the linear support means can be made rigid or compressible and can also be optionally made as a separate part altogether, such as for example a plurality of rubber strips. Further, more than one of such linear support means can be used together to resist deflection of the housing over a single button area (not shown).

Figure 3:
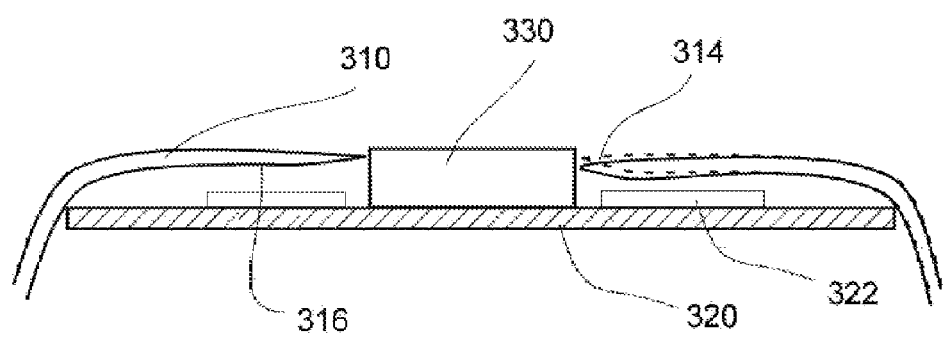
FIG. 3 is a cross-section of the third preferred embodiment of the invention.

FIG. 3 shows a third embodiment of the invention where the electronic housing 310 is suspended in a cantilever fashion away from the opening in the housing such that when a user applies force on a user input zone 310, the housing deflects as shown from the nominal non-compressed state indicated by dashed lines 314. The thin housing could be made from plastic or metal. This embodiment shows an element 330 protruding from the rigid base 320 through the opening in the housing 310. This element may be a display module, a high resolution input device or may serve other function for the electronic device.

The inside surface of the housing 310 is again metalized or painted with a conductive material if it isn't made from a conductive material and connected to the ground reference of a circuit that can measure the capacitance formed by 316 and electrode 322. The electrode 322 can be formed by printed circuit board 320 etching method or by printing a conductive paint over a base 320.

Optional linear supporting means can be used to support certain regions of the touch-sensitive zone of the housing (not shown) as may be dictated by the outline of the user input buttons.

Metal sheets can be used to form the housing of the electronic device. Finite Element Analysis has indicated that for the best performance of this invention, the range of stainless steel sheet thickness usable to construct the housing is between 0.001 and 0.007 of an inch, preferably about 0.004-0.005 of an inch. For aluminum, this range is about 0.001 to 0.012 of an inch, and preferably about 0.006 to 0.008 of an inch. For plastics, this range is broader at about 0.001 to 0.040 of an inch, with the prefered range of about 0.015 to 0.025 of an inch depending on the polymer.

Figure 4:
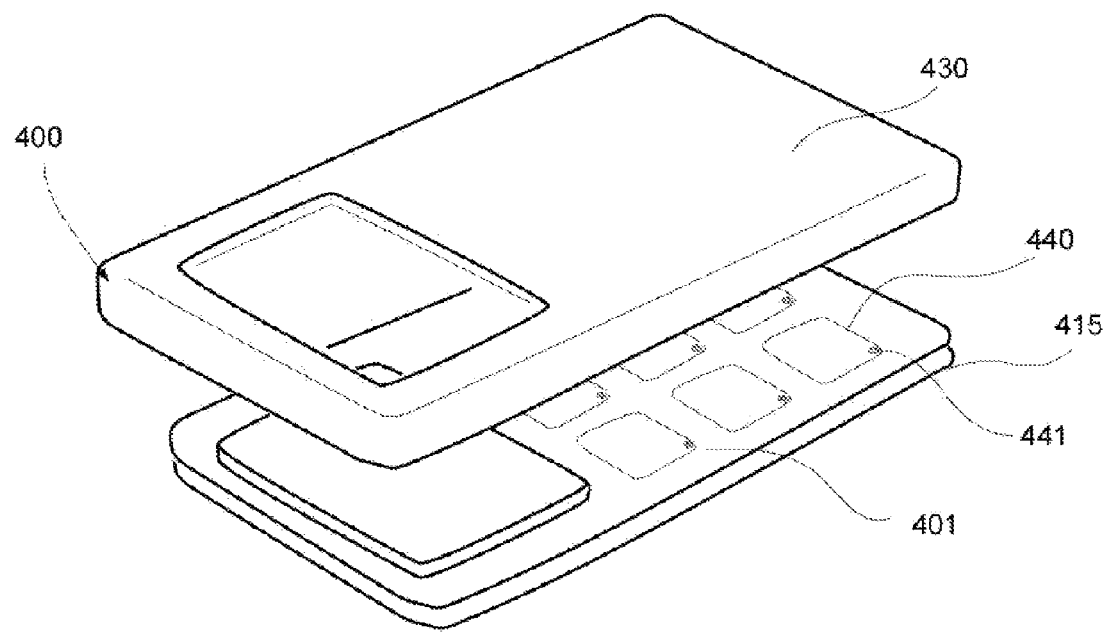
FIG. 4 is a general example of an electronic device with housing incorporating a user input zone.

FIG. 4 shows a general example of an electronic device using a housing of the present invention. The housing 400 of the electronic device comprises a bottom half 415 and the top half having a deformable contact force-sensitive user input zone 430. The zone 430 is made to have a conductive inside surface forming a first conductive layer. The rigid base 401 has button-shaped electrodes 440 forming a second conductive layer and facing the inside surface of the housing 400 while spaced apart therefrom. A capacitance sensor is therefore formed having a number of buttons therein. Each button location 440 is equipped with a separate electrical connection 441 connecting this location to a capacitance measuring circuit (not shown). The user input zone 430 may have an indicia indicating the location and size of the buttons to the user (not shown).

Figure 5:
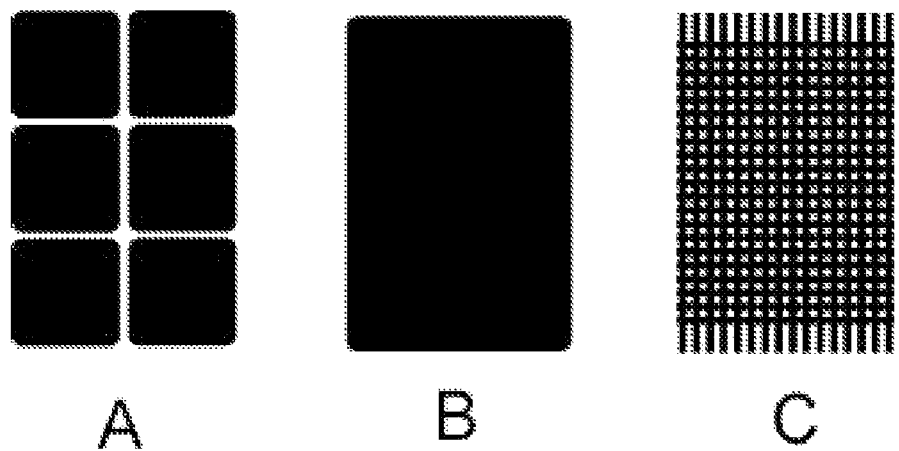
FIG. 5 shows one advantageous example of the electrode patterns for the fourth embodiment of the housing of the present invention.

FIG. 5 shows a fourth embodiment of the invention combining a touch-sensitive proximity sensor functionality in addition to the housing as a contact force input device. This is achieved by making first conductive layer of the inside surface of the housing to have a mesh or some other similar non-continuous pattern.

FIG. 5a shows the button-shaped pattern of electrodes for the second conductive layer on the rigid base made for example as a printed circuit board (pcb). FIG. 5b shows the corresponding traditional first conductive layer on the inside surface of the housing, which is a continuous metalized surface. By substituting the continuous first conductive layer of the housing with a mesh or non-continuous conductive surface, additional functionality of the proximity sensor can be obtained. An example of such mesh electrode design is shown on FIG. 5c. When the user moves their finger towards the housing, the finger acts as a ground electrode object thus allowing the circuitry of the device to detect the presence of the finger and its location and therefore generate an input signal. When force is applied to the housing, the mesh conductive layer deflects closer to the rigid base pcb thus increasing the capacitance even further as described previously. By selectively changing the mesh size, the percentage of the housing acting like a proximity sensor or a force sensor can be tuned for the particular application needs. This dual mode of operation can provide the benefits of a light touch scroll offered by a proximity touch sensor while allowing more definitive push button selection though the housing as a second input mode of operation.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A housing for an electronic device with integrated user input capability comprising:
a housing body containing an opening and a deformable user input zone adjacent to said opening, said user input zone having a conductive inside surface as a first conductive layer, said inside surface being supported only on one side away from said opening and therefore suspended in a cantilever fashion away from said opening,
a rigid base spaced apart from said inside surface of the user input zone of the housing at a predetermined gap distance, said base having a second conductive layer facing said first conductive layer,
a capacitance measuring circuit connected to both said first and second conductive layers,
whereby a capacitance sensor is formed between said first and second conductive layers, said sensor is responsive to deformation of the housing towards said rigid base at the user input zone caused by applying force onto said zone, said deformation causing a change in capacitance between said first and said second conductive layers, said change in capacitance being detected by said capacitance measuring circuit and transmitted as a user input signal to said electronic device.

2. The device as in claim 1, wherein said housing is made from a non-conductive material and said first conductive layer is made by applying a conductive material onto said inside surface.

3. The device as in claim 1, wherein said second conductive layer having a plurality of buttons, said capacitance measuring curcuitry adapted to detect a location of the user input in addition to said change in capacitance measured at the same location and use both as input signals to said electronic device.

4. The device as in claim 1 further comprising a display module protruding through said opening.

* * * * *